US010836229B2

(12) United States Patent
Berlingieri et al.

(10) Patent No.: US 10,836,229 B2
(45) Date of Patent: Nov. 17, 2020

(54) LEAF SPRING SUSPENSION SYSTEM FOR A VEHICLE

(71) Applicant: RASSINI SUSPENSIONES, S.A. DE C.V., Del. Miguel Hidalgo (MX)

(72) Inventors: Anthony Berlingieri, Plymouth, MI (US); Jose G. Delgado, Coahuila (MX); Ramon Heberto Diego Guedea, Ann Arbor, MI (US); Robert W. Friedrichs, South Lyon, MI (US); Chris Galea, Monroe, MI (US); Jesus Ernesto Meza, Coahuila (MX); Jose Roberto Frausto Rodriguez, Coahuila (MX); Jose G. Ruiz Juarez, Coahuila (MX); James N. Zeimet, Commerce Township, MI (US)

(73) Assignee: Rassini Suspensiones, S.A. de C.V. (MX)

( * ) Notice: Subject to any disclaimer, the term of this patent is extended or adjusted under 35 U.S.C. 154(b) by 61 days.

(21) Appl. No.: 15/765,928

(22) PCT Filed: Nov. 9, 2016

(86) PCT No.: PCT/US2016/061094
§ 371 (c)(1),
(2) Date: Apr. 4, 2018

(87) PCT Pub. No.: WO2017/083358
PCT Pub. Date: May 18, 2017

(65) Prior Publication Data
US 2018/0281541 A1    Oct. 4, 2018

Related U.S. Application Data

(60) Provisional application No. 62/253,372, filed on Nov. 10, 2015.

(51) Int. Cl.
*B60G 11/12* (2006.01)
*B60G 11/04* (2006.01)
(Continued)

(52) U.S. Cl.
CPC .............. *B60G 11/12* (2013.01); *B60G 11/04* (2013.01); *B60G 11/113* (2013.01); *F16F 1/26* (2013.01);
(Continued)

(58) Field of Classification Search
CPC ......... B60G 11/00; B60G 11/12; B60G 11/02; B60G 11/04
See application file for complete search history.

(56) References Cited

U.S. PATENT DOCUMENTS 250,610 A * 12/1881 White .................... B60G 11/02
267/39
1,601,110 A * 9/1926 Crouch .................. B60G 11/02
267/45
(Continued)

FOREIGN PATENT DOCUMENTS

WO    2006121438 A2    11/2006

OTHER PUBLICATIONS

International Search Report regarding related PCT App. No. PCT/US2016/061094; dated Mar. 6, 2017; 6 pgs.
(Continued)

*Primary Examiner* — Faye M Fleming
(74) *Attorney, Agent, or Firm* — Dickinson Wright PLLC

(57) ABSTRACT

A leaf spring suspension system for a vehicle includes a chassis rail. Also included is a pivot block operatively coupled to the chassis rail and rotatable relative to the chassis rail. Further included is a leaf spring operatively coupled to the pivot block proximate an end of the leaf spring. Yet further included is a half leaf spring operatively
(Continued)

coupled to the pivot block proximate a first end of the half leaf spring and operatively coupled to a vehicle axle proximate a second end of the half leaf spring.

16 Claims, 4 Drawing Sheets

(51) Int. Cl.
*B60G 11/113* (2006.01)
*F16F 1/26* (2006.01)
*F16F 3/02* (2006.01)
*B60G 9/00* (2006.01)

(52) U.S. Cl.
CPC ............... *F16F 3/023* (2013.01); *B60G 9/00* (2013.01); *B60G 2202/112* (2013.01); *B60G 2204/121* (2013.01); *B60G 2204/41* (2013.01); *B60G 2204/4306* (2013.01); *F16F 2230/0005* (2013.01)

(56) References Cited

U.S. PATENT DOCUMENTS

| | | | | |
|---|---|---|---|---|
| 5,137,300 | A * | 8/1992 | Walton | B60G 11/04 267/261 |
| 5,362,095 | A * | 11/1994 | Eveley | B60G 9/003 267/269 |
| 7,918,469 | B2 * | 4/2011 | Hoppert | B60G 7/001 280/124.102 |
| 8,668,215 | B2 * | 3/2014 | Juriga | B60G 11/113 280/124.174 |
| 8,882,120 | B2 * | 11/2014 | Juriga | B60G 9/00 280/124.174 |
| 10,315,480 | B2 * | 6/2019 | Everline | B60G 11/04 |
| 2005/0269796 | A1 | 12/2005 | Sawarynski et al. | |
| 2006/0290089 | A1 | 12/2006 | Dudding et al. | |
| 2007/0145656 | A1 * | 6/2007 | Svendsen | B60G 5/00 267/260 |
| 2012/0161411 | A1 | 6/2012 | Ehrlich et al. | |
| 2012/0200057 | A1 | 8/2012 | Juriga et al. | |
| 2018/0126815 | A1 * | 5/2018 | Berlingieri | B60G 11/10 |

OTHER PUBLICATIONS

Written Opinion regarding related PCT App. No. PCT/US2016/061094; dated Mar. 6, 2017; 9 pgs.

* cited by examiner

LEAF SPRING SUSPENSION SYSTEM FOR A VEHICLE

CROSS-REFERENCE TO RELATED APPLICATIONS

This application is based on PCT/US2016/061094 filed on Nov. 9, 2016, which claims the benefit of priority to U.S. Provisional Patent Application Ser. No. 62/253,372, filed Nov. 10, 2015.

FIELD OF THE INVENTION

This invention relates generally to leaf spring suspension systems for vehicles.

BACKGROUND

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one another to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

The well-known Hotchkiss drive, the name of which derives from the French automobile firm of Hotchkiss, employs a solid axle that is coupled at its ends to the centers of respective semi-elliptical leaf springs. There are a number of problems with this form of drive arrangement. First, this drive system is characterized by high unsprung mass. Additionally, the use of a solid axle results in coupled left/right wheel motion. During heavy cornering and fast acceleration, this known system suffers from vertical deflection and wind-up.

One effort to address the problems associated with the Hotchkiss system employs a parallel leaf spring arrangement at each end of a solid axle. This known arrangement affords increased axle control, in the form of reduced power hop. Other advantages of this arrangement include roll under steer, auto load leveling and the gross vehicle weight, and no frame changes are required to convert from a Hotchkiss system. However, the parallel leaf spring arrangement employs a solid axle, and therefore does not provide the benefits of independent suspension. In addition, this arrangement is plagued with the disadvantage of high unsprung mass.

Accordingly, leaf spring suspension systems suffer from numerous drawbacks that may be improved upon.

SUMMARY OF THE INVENTION

According to one embodiment, a leaf spring suspension system for a vehicle includes a chassis rail. Also included is a pivot block operatively coupled to the chassis rail and rotatable relative to the chassis rail. Further included is a leaf spring operatively coupled to the pivot block proximate an end of the leaf spring. Yet further included is a half leaf spring operatively coupled to the pivot block proximate a first end of the half leaf spring and operatively coupled to a vehicle axle proximate a second end of the half leaf spring.

In addition to one or more of the features described above, or as an alternative, further embodiments may include a bushing operatively coupled to the chassis rail, the bushing providing a bearing surface for the pivot block to rotate about.

In addition to one or more of the features described above, or as an alternative, further embodiments may include that the pivot block rotates in response to a braking or acceleration event of the vehicle.

In addition to one or more of the features described above, or as an alternative, further embodiments may include that forces from the leaf spring are imparted on the half leaf spring with the pivot block during a braking or acceleration event of the vehicle.

In addition to one or more of the features described above, or as an alternative, further embodiments may include a hinge assembly operatively coupled to the leaf spring and to the vehicle axle, the hinge assembly rotatable about the vehicle axle during displacement of the leaf spring.

In addition to one or more of the features described above, or as an alternative, further embodiments may include that the hinge assembly comprises a revolute joint.

In addition to one or more of the features described above, or as an alternative, further embodiments may include that the hinge assembly is operatively coupled to the leaf spring with at least one mechanical fastener.

In addition to one or more of the features described above, or as an alternative, further embodiments may include that each of the leaf spring and the half leaf spring is not directly coupled to the chassis rail.

According to another embodiment, a leaf spring suspension system for a vehicle includes a chassis rail. Also included is a bushing directly coupled to the chassis rail in a fixed manner. Further included is a pivot block mounted to the bushing and rotatable relative to the bushing. Yet further included is a leaf spring clamped to the pivot block proximate an end of the leaf spring. Also included is a half leaf spring clamped to the pivot block proximate a first end of the half leaf spring and operatively coupled to a vehicle axle proximate a second end of the half leaf spring.

In addition to one or more of the features described above, or as an alternative, further embodiments may include that the pivot block rotates in response to a braking or acceleration event of the vehicle.

In addition to one or more of the features described above, or as an alternative, further embodiments may include that forces from the leaf spring are imparted on the half leaf spring with the pivot block during a braking or acceleration event of the vehicle.

In addition to one or more of the features described above, or as an alternative, further embodiments may include a hinge assembly operatively coupled to the leaf spring and to the vehicle axle, the hinge assembly rotatable about the vehicle axle during displacement of the leaf spring.

In addition to one or more of the features described above, or as an alternative, further embodiments may include that the hinge assembly comprises a revolute joint.

In addition to one or more of the features described above, or as an alternative, further embodiments may include that the hinge assembly is operatively coupled to the leaf spring with at least one mechanical fastener.

In addition to one or more of the features described above, or as an alternative, further embodiments may include that each of the leaf spring and the half leaf spring is not directly coupled to the chassis rail.

According to yet another embodiment, a leaf spring suspension system for a vehicle includes a chassis rail. Also included is a pivot block operatively coupled to the chassis rail and rotatable relative to the chassis rail. Further included is a leaf spring operatively coupled to the pivot block proximate an end of the leaf spring. Yet further included is a half leaf spring operatively coupled to the pivot block proximate a first end of the half leaf spring and operatively coupled to a vehicle axle proximate a second end of the half leaf spring. Also included is a hinge assembly operatively coupled to the leaf spring and to the vehicle axle, the hinge assembly rotatable about the vehicle axle during displacement of the leaf spring.

In addition to one or more of the features described above, or as an alternative, further embodiments may include that the hinge assembly comprises a revolute joint.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
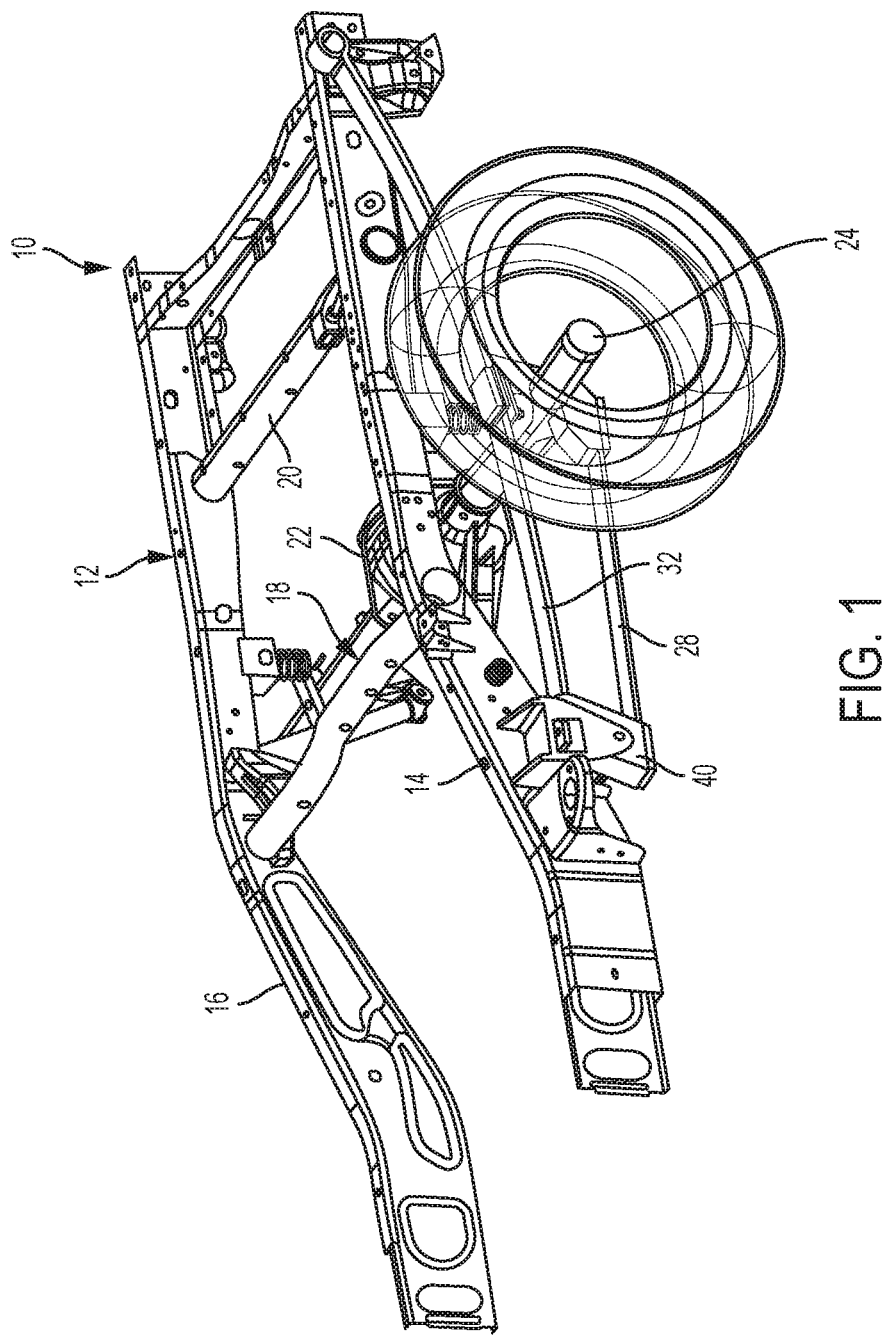
FIG. 1 is a perspective view of a vehicle suspension system.

Referring to FIG. 1, illustrated is a vehicle suspension system 10 having a chassis generally designated with numeral 12. The chassis 12 includes a first chassis rail 14 and a second chassis rail 16 that are arranged substantially parallel to each other. The first and second chassis rails 14, 16 are coupled to each another by at least one cross brace, such as a first cross brace 18 and a second cross brace 20, as shown. A differential drive arrangement 22 is fixedly coupled to the chassis 12 and converts the rotary motion of a drive shaft (not shown) to substantially orthogonal rotary motion at shaft 24. The shaft 24 includes an associated pair of universal joints (not specifically designated) that are arranged to be proximal and distal with respect to the differential drive arrangement 22. Thus, the shaft 24 has an associated longitudinal axis to accommodate transaxial motion. It is to be appreciated that the shaft 24 refers to a pair of half shafts in some embodiments. The half shafts may be disposed within a single sleeve or uncovered.

The shaft 24 is operatively coupled at distal ends to respective half leaf springs, only one of which is illustrated and is referred to with numeral 28. Half leaf spring 28 is operatively coupled to the chassis rail 14 proximate a first end of the half leaf spring and to the shaft 24 proximate a second end of the half leaf spring. In particular, the half leaf spring 28 is coupled to a pivot block 40 which is coupled to the chassis rail 14. The pivot block is discussed in detail below. It is to be appreciated that multiple leaf springs may be disposed in a stacked arrangement to form what is referred to herein as the half leaf spring 28.

Disposed in spaced arrangement from the half leaf spring 28 is a leaf spring 32 operatively coupled at a first end and a second end to the chassis rail 14. In particular, the leaf spring 32 is coupled at its first end to the above-noted pivot block which is coupled to the chassis rail 14. As with the half leaf springs, the leaf spring 32 may refer to a plurality of leaf springs disposed in a stacked arrangement. As noted above, the leaf spring 32 is in spaced arrangement with the half leaf spring 28. In particular, although the leaf spring 32 is illustrated as being above the half leaf spring 28, the leaf spring 32 may be located below the half leaf spring 28 in some embodiments. For purposes of discussion, only leaf springs 28 and 32 have been described in detail, but it is to be appreciated that corresponding leaf springs are located on an opposing side of the chassis 12 proximate chassis rail 16.

The above-described springs, e.g., leaf springs 28 and 32 may be referred to as "semi-elliptical" springs configured as arc-shaped length segments. In some embodiments, the springs are formed of spring steel having a substantially rectangular cross-section. In other embodiments, a composite material may be used. However, alternative materials and geometries are contemplated.

Figure 2:
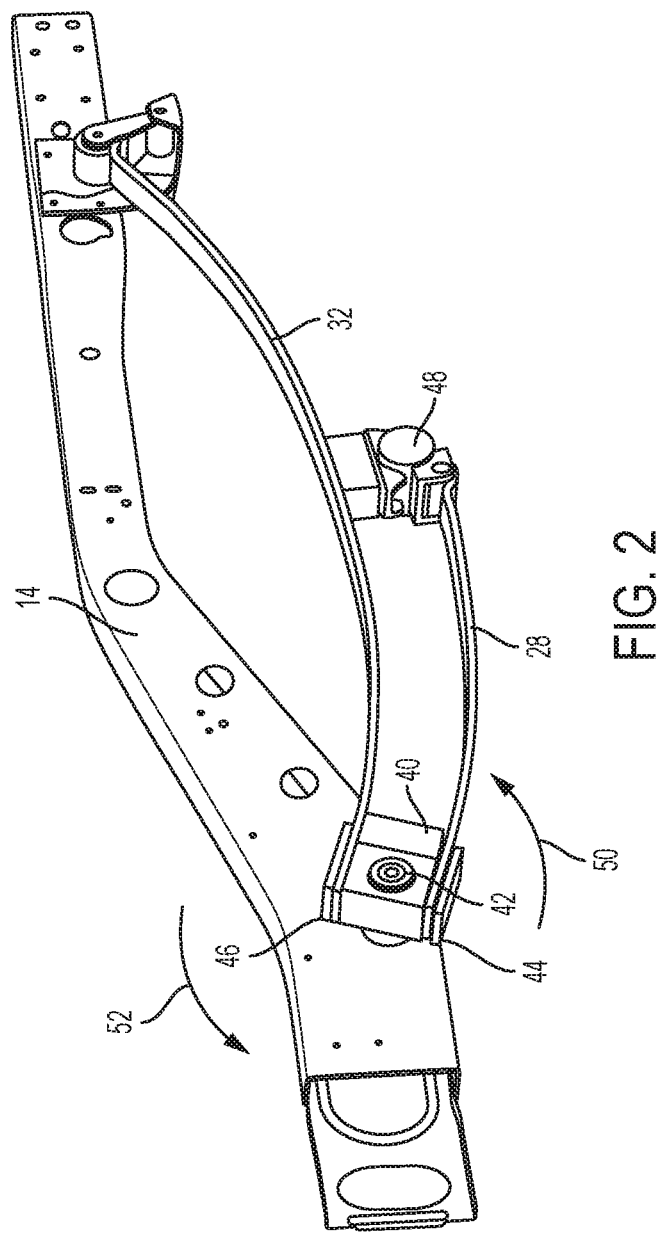
FIG. 2 is a perspective view of a leaf spring arrangement and chassis rail of the vehicle suspension system.

Referring now to FIG. 2, a pivot block 40 is included to provide a rotatable coupling interface between the chassis rail 14 and the half leaf spring 28, as well as between the chassis rail 14 and the leaf spring 32. The pivot block 40 is operatively coupled in a rotatable manner to the chassis rail 14. In the illustrated embodiment, a bushing 42 is fixedly coupled to the chassis rail 14 and the pivot block 40 is mounted to the bushing 42 via a pivot block aperture that the bushing extends at least partially through. The pivot block 40 is rotatable about a central axis of the bushing 42 and rotates about an outer surface of the bushing 42.

As described above, the half leaf spring 28 and the leaf spring 32 are each coupled to the pivot block 40. In particular, a first end 44 of the half leaf spring 28 is coupled to the pivot block 40 and a first end 46 of the leaf spring 32 is coupled to the pivot block. The couplings between the leaf springs and the pivot block 40 may be made in numerous contemplated ways. For example, a clamping mechanism may be included to exert a clamping force on the respective first ends of the leaf springs 28, 32 to maintain a fixed relationship between the pivot block 40 and the leaf springs 28, 32.

Irrespective of the precise manner in which the leaf springs 28, 32 are coupled to the pivot block 40, the springs are decoupled from the chassis rail 14 to allow freedom of movement in response to forces imparted on the vehicle suspension system 10 during braking and acceleration operations of a vehicle. In operation, during a braking operation, the pivot block 40 rotates in a first rotational direction 50, which is counter-clockwise in the illustrated view of FIG. 2. This rotation transmits forces from the leaf spring 32 to half leaf spring 28 and hence the axle 48 of the vehicle which is operatively coupled to the half leaf spring 28 via shaft 24. Conversely, during an acceleration operation, the pivot block 40 rotates in a second rotational direction 50 that is opposite to the first rotational direction and which is clockwise in the illustrated view of FIG. 2. This rotation transmits forces from the half leaf spring 28 to leaf spring 32.

Regardless of whether the vehicle suspension system 10 is undergoing a braking or acceleration event, the coordination of the leaf springs 28, 32 and the pivot block 40 prevent the axle of the vehicle from over-rotating beyond a desired degree of angular rotation by controlling the windup of the leaf spring arrangement.

It is to be further appreciated that the stiffness of the overall leaf spring arrangement may be controlled by modifying the tendency of the pivot block to rotate. For example, the coupling of the bushing 42 to the chassis rail 14 and/or the pivot block 40 to the bushing 42 may be adjusted to control the stiffness of the overall leaf spring arrangement.

Figure 3:
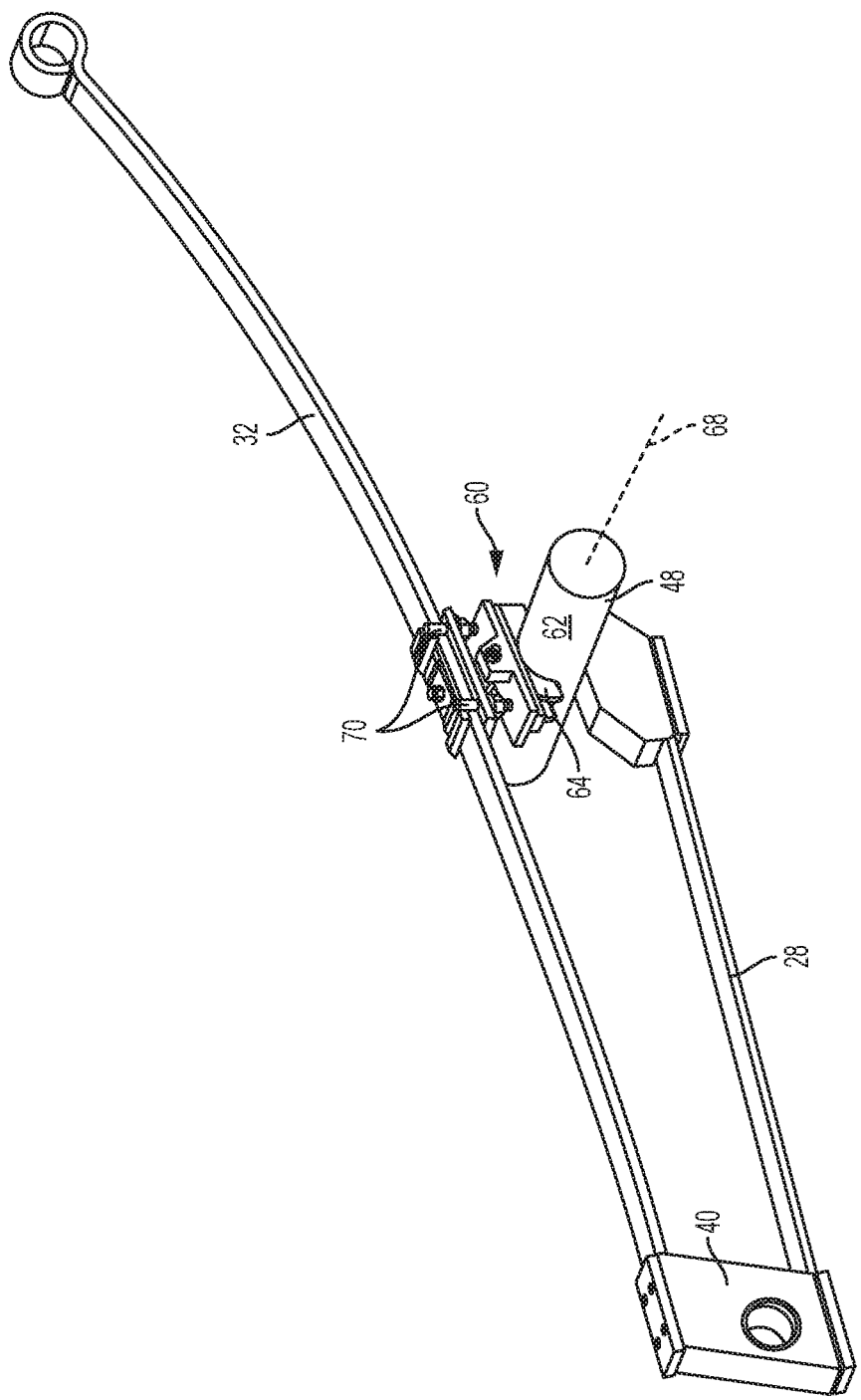
FIG. 3 is a perspective view of the leaf spring arrangement.
Figure 4:
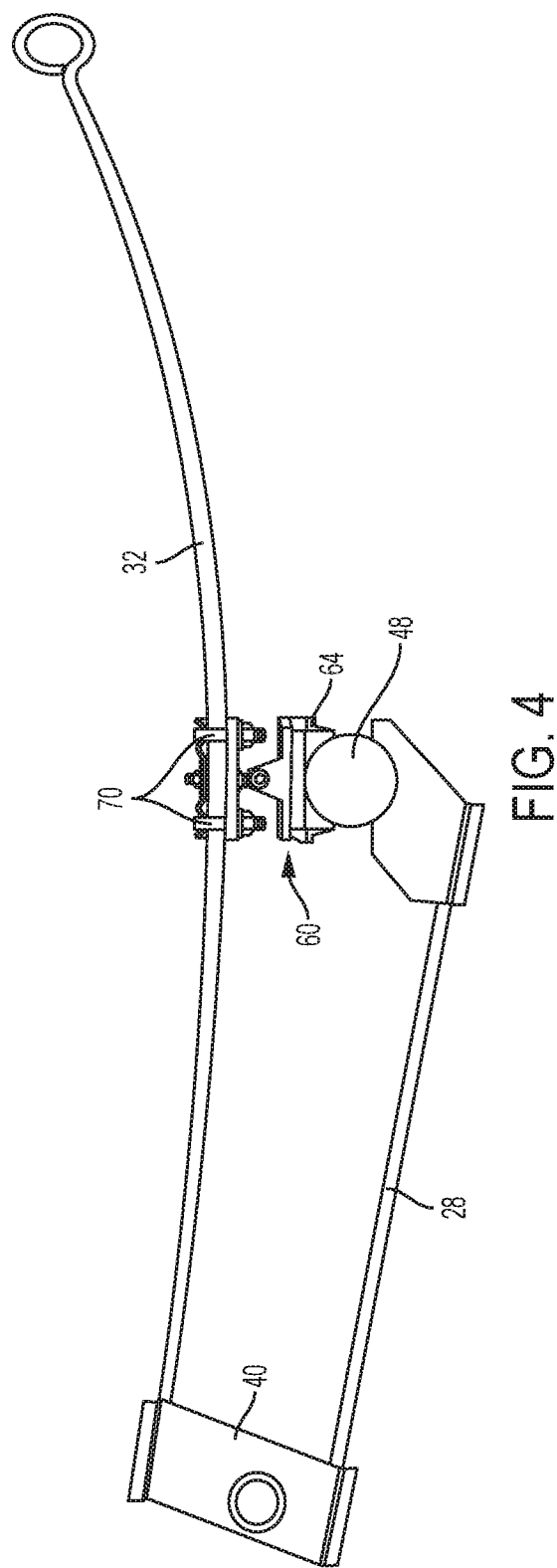
FIG. 4 is an elevational view of the leaf spring arrangement.

Referring now to FIGS. 3 and 4, another aspect of the invention is illustrated. In particular, a hinge assembly 60 is operatively coupled to the leaf spring 32. During operation of the vehicle suspension system 10, and particularly during the acceleration and braking operations described in detail above, the leaf spring 32 undergoes stress in response to flexure of the leaf spring 32. To alleviate the stress associated with such operation, the hinge assembly 60 is provided.

The hinge assembly 60 provides stress relief for the leaf spring 32 by rotating about an outer surface 62 of the axle 48 to which the hinge assembly 60 is mounted. In some embodiments, the hinge assembly 60 is a revolute joint formed by the axle 48 and hinge component 64 that is mounted to the axle 48. In such embodiments, the revolute joint provides single-axis rotation about an axis 68 of the axle 48. The hinge assembly 60 also includes at least one fastening structure, such as the pair of mechanical fasteners 70, to operatively couple the hinge assembly 60 to the leaf spring 32. The pair of mechanical fasteners 70 each at least partially wrap around the leaf spring 32 to secure the leaf spring 32 to the hinge assembly 60.

It is to be appreciated that the hinge assembly 60 illustrated in FIGS. 3 and 4 may be used in combination with embodiments of the vehicle suspension arrangement 10 that include the pivot block 40 described above. Alternatively, the hinge assembly 60 may be employed independently of the pivot block 40 in other embodiments of the vehicle suspension arrangement 10.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

Having thus described the invention, it is claimed:

1. A leaf spring suspension system for a vehicle comprising:
   a chassis rail;
   a pivot block operatively coupled to the chassis rail and rotatable relative to the chassis rail;
   a leaf spring operatively coupled to the pivot block proximate an end of the leaf spring;
   a half leaf spring operatively coupled to the pivot block proximate a first end of the half leaf spring and operatively coupled to a vehicle axle proximate a second end of the half leaf spring;
   a bushing operatively coupled to the chassis rail and extending through an aperture of the pivot block to provide a bearing surface for the pivot block to rotate about, the pivot block rotatable about a central axis of the bushing; and
   a clamping mechanism positioned to clamp the leaf spring and the half leaf spring to outer edges of the pivot block.

2. The leaf spring suspension system of claim 1, wherein the pivot block rotates in response to a braking or acceleration event of the vehicle.

3. The leaf spring suspension system of claim 2, wherein forces from the leaf spring are imparted on the half leaf spring with the pivot block during a braking or acceleration event of the vehicle.

4. The leaf spring suspension system of claim 1, further comprising a hinge assembly operatively coupled to the leaf spring and to the vehicle axle, the hinge assembly rotatable about the vehicle axle during displacement of the leaf spring.

5. The leaf spring suspension system of claim 4, wherein the hinge assembly comprises a revolute joint.

6. The leaf spring suspension system of claim 4, wherein the hinge assembly is operatively coupled to the leaf spring with at least one mechanical fastener.

7. The leaf spring suspension system of claim 1, wherein each of the leaf spring and the half leaf spring is not directly coupled to the chassis rail.

8. A leaf spring suspension system for a vehicle comprising:
   a chassis rail;
   a bushing directly coupled to the chassis rail in a fixed manner;
   a pivot block mounted to the bushing and rotatable relative to the bushing, the bushing extending through an aperture of the pivot block to provide a bearing surface for the pivot block to rotate about, the pivot block rotatable about a central axis of the bushing;
   a leaf spring clamped to the pivot block proximate an end of the leaf spring;
   a half leaf spring clamped to the pivot block proximate a first end of the half leaf spring and operatively coupled to a vehicle axle proximate a second end of the half leaf spring; and
   a clamping mechanism positioned to clamp the leaf spring and the half leaf spring to outer edges of the pivot block.

9. The leaf spring suspension system of claim 8, wherein the pivot block rotates in response to a braking or acceleration event of the vehicle.

10. The leaf spring suspension system of claim 9, wherein forces from the leaf spring are imparted on the half leaf spring with the pivot block during a braking or acceleration event of the vehicle.

11. The leaf spring suspension system of claim 8, further comprising a hinge assembly operatively coupled to the leaf spring and to the vehicle axle, the hinge assembly rotatable about the vehicle axle during displacement of the leaf spring.

12. The leaf spring suspension system of claim 11, wherein the hinge assembly comprises a revolute joint.

13. The leaf spring suspension system of claim 11, wherein the hinge assembly is operatively coupled to the leaf spring with at least one mechanical fastener.

14. The leaf spring suspension system of claim 8, wherein each of the leaf spring and the half leaf spring is not directly coupled to the chassis rail.

15. A leaf spring suspension system for a vehicle comprising:
   a chassis rail;
   a pivot block operatively coupled to the chassis rail and rotatable relative to the chassis rail;
   a leaf spring operatively coupled to the pivot block proximate an end of the leaf spring;

a half leaf spring operatively coupled to the pivot block proximate a first end of the half leaf spring and operatively coupled to a vehicle axle proximate a second end of the half leaf spring;

a clamping mechanism positioned to clamp the leaf spring and the half leaf spring to outer edges of the pivot block; and a hinge assembly mechanically fastened to the leaf spring and to the vehicle axle, the hinge assembly rotatable about the vehicle axle during displacement of the leaf spring.

16. The leaf spring suspension system of claim 15, wherein the hinge assembly comprises a revolute joint.

* * * * *